US011590989B2

(12) United States Patent
Majithia

(10) Patent No.: US 11,590,989 B2
(45) Date of Patent: Feb. 28, 2023

(54) TRAINING DATA GENERATION FOR DYNAMIC OBJECTS USING HIGH DEFINITION MAP DATA

(71) Applicant: NVIDIA CORPORATION, Santa Clara, CA (US)

(72) Inventor: Chirag Majithia, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 266 days.

(21) Appl. No.: 16/919,128

(22) Filed: Jul. 2, 2020

(65) Prior Publication Data

US 2021/0001891 A1 Jan. 7, 2021

Related U.S. Application Data

(60) Provisional application No. 62/870,600, filed on Jul. 3, 2019.

(51) Int. Cl.
*B60W 60/00* (2020.01)
*B60W 50/06* (2006.01)
*G01C 21/34* (2006.01)
*G06N 3/08* (2023.01)

(52) U.S. Cl.
CPC ........ *B60W 60/0025* (2020.02); *B60W 50/06* (2013.01); *G01C 21/3461* (2013.01); *G06N 3/08* (2013.01)

(58) Field of Classification Search
CPC .............. B60W 60/0025; B60W 50/06; G01C 21/3461; G06N 3/08
See application file for complete search history.

(56) References Cited

U.S. PATENT DOCUMENTS

| 10,928,819 | B2* | 2/2021 | Viswanathan | G05D 1/0088 |
| 2018/0068206 | A1* | 3/2018 | Pollach | G06K 9/6289 |
| 2018/0189578 | A1* | 6/2018 | Yang | G06K 9/00798 |
| 2018/0188043 | A1 | 7/2018 | Chen et al. | |
| 2018/0348343 | A1 | 12/2018 | Achour et al. | |

(Continued)

OTHER PUBLICATIONS

Kiran, R., "Real-time Dynamic Object Detection for Autonomous Driving using Prior 3D-Maps", 2018 (Year: 2018).*

(Continued)

*Primary Examiner* — Gertrude Arthur Jeanglaude
*Assistant Examiner* — Brittany Renee Peko
(74) *Attorney, Agent, or Firm* — Maschoff Brennan

(57) ABSTRACT

According to an aspect of an embodiment, operations may comprise receiving a plurality of frame sets generated while navigating a local environment, receiving an occupancy map (OMap) representation of the local environment, for each of the plurality of frame sets, generating, using the OMap representation, one or more instances each comprising a spatial cluster of neighborhood 3D points generated from a 3D sensor scan of the local environment, and classifying each of the instances as dynamic or static, tracking instances classified as dynamic across the plurality of frame sets using a tracking algorithm, assigning a single instance ID to tracked instances classified as dynamic across the plurality of frame sets, estimating a bounding box for each of the instances in each of the plurality of frame sets, and employing the instances as ground truth data in a training of one or more deep learning classifiers.

21 Claims, 15 Drawing Sheets

(56) References Cited

U.S. PATENT DOCUMENTS

| | | | |
|---|---|---|---|
| 2018/0373980 A1* | 12/2018 | Huval | G06N 3/08 |
| 2019/0108396 A1 | 4/2019 | Dal Mutto et al. | |
| 2021/0001877 A1* | 1/2021 | Han | B60W 60/001 |
| 2022/0066021 A1* | 3/2022 | Fu | G01S 13/867 |
| 2022/0076432 A1* | 3/2022 | Ramezani | G06T 7/246 |

OTHER PUBLICATIONS

Wirges, S., "Object Detection and Classification in Occupancy Grid Maps using Deep Convolutional Networks", Nov. 2018 (Year: 2018).*

International Search Report and Written Opinion issued in corresponding application No. PCT/US2020/040942, dated Sep. 25, 2020.

* cited by examiner

TRAINING DATA GENERATION FOR DYNAMIC OBJECTS USING HIGH DEFINITION MAP DATA

CROSS-REFERENCE TO A RELATED APPLICATION

This patent application claims the benefit of and priority to U.S. Provisional App. No. 62/870,600 filed Jul. 3, 2019, which is incorporated by reference in the present disclosure in its entirety for all that it discloses.

FIELD

The embodiments discussed herein are related to maps for autonomous vehicles, and more particularly training data generation for dynamic objects using high definition (HD) map data.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving a plurality of frame sets generated while navigating a local environment, with each frame set comprising a point cloud representation of three-dimensional (3D) points. The operations may also comprise receiving an occupancy map (OMap) representation of the local environment, with the OMap representation comprising points depicting static objects in the local environment, and with the OMap representation further comprising the ground and navigable boundaries within the local environment. The operations may also comprise, for each of the plurality of frame sets, generating, using the OMap representation, one or more instances each comprising a spatial cluster of neighborhood 3D points generated from a 3D sensor scan of the local environment, and classifying each of the instances as dynamic or static based on the OMap representation by applying a deep learning algorithm to the instance. The operations may also comprise tracking instances classified as dynamic across the plurality of frame sets using a tracking algorithm. The operations may also comprise assigning a single instance ID to tracked instances classified as dynamic across the plurality of frame sets. The operations may also comprise estimating a bounding box for each of the instances in each of the plurality of frame sets. The operations may also comprise employing the instances as ground truth data in a training of one or more deep learning classifiers.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
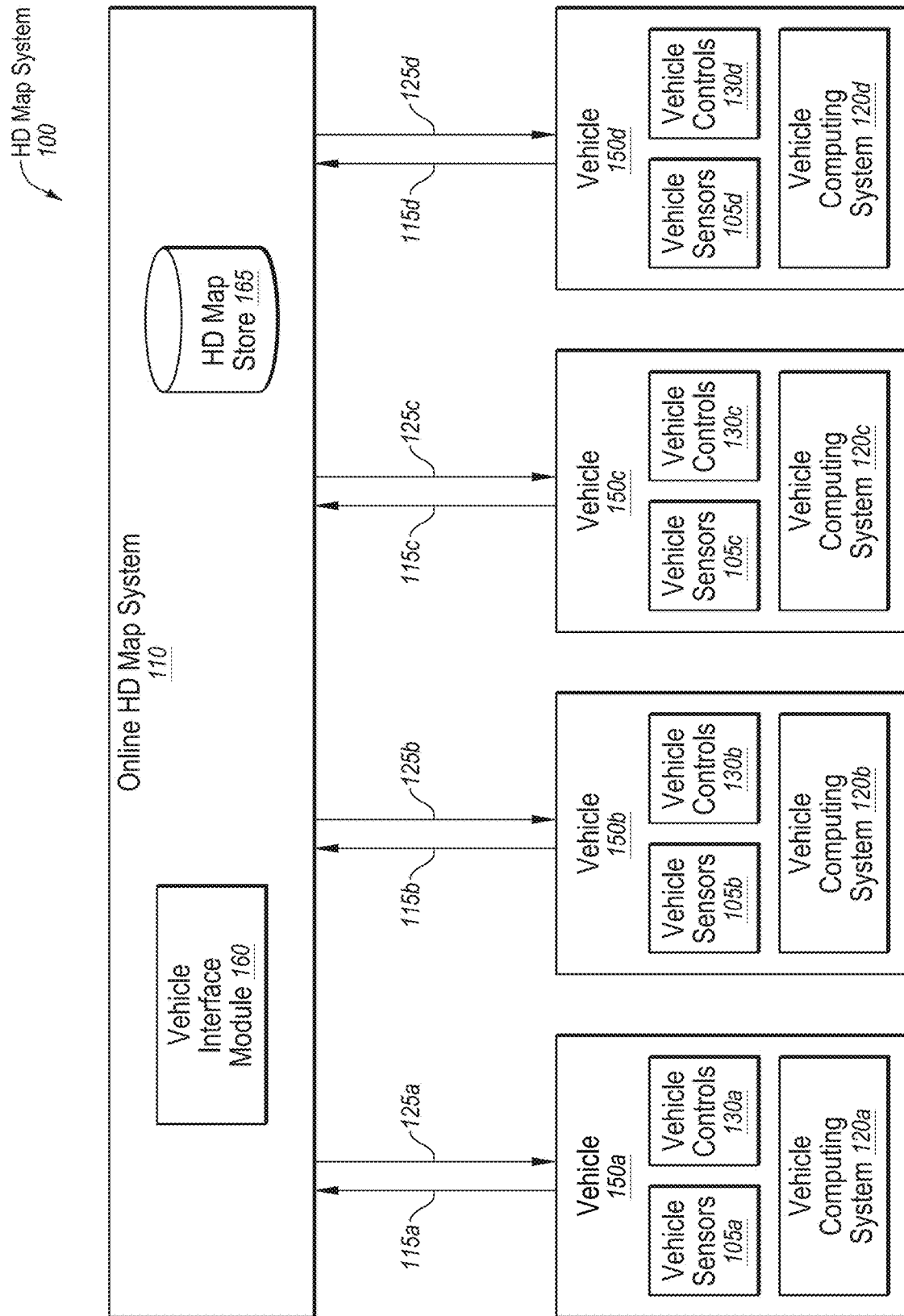
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may generate training data for dynamic objects using HD map data. Safe navigation of autonomous vehicles may involve detecting dynamic objects (e.g., cars, pedestrians, etc.) on the road from continually tracked three-dimensional (3D) sensor data. In some embodiments, dynamic object detection uses deep learning object detection classifiers. However, along with object detection, continual generation of training data may allow for ground truth labels and improving the performance of the deep-learning classifiers.

In some embodiments, a system may use sensor data (e.g., LIDAR data) comprising 3D data points corresponding to objects surrounding the vehicle that are tracked using a sensor assembly, such as LIDAR. The 3D data points may correspond to dynamic objects, such as other vehicles that are parked or moving, as well as static and permanent objects, such as buildings. For example, LIDAR data may capture both static objects (e.g., buildings, roads, etc.) and dynamic objects (e.g., cars, pedestrians, etc.). The system may then use information from a clean OMap to assist in generating labeled data representing distinct objects, as well as in identifying false positives and false negatives in the deep learning algorithm models, to generate training data that may be employed in a training of one or more deep learning classifiers. Further, some embodiments may enable the OMap to be cleaned to remove points depicting dynamic objects in the local environment so that the OMap includes points depicting only static objects in the local environment.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
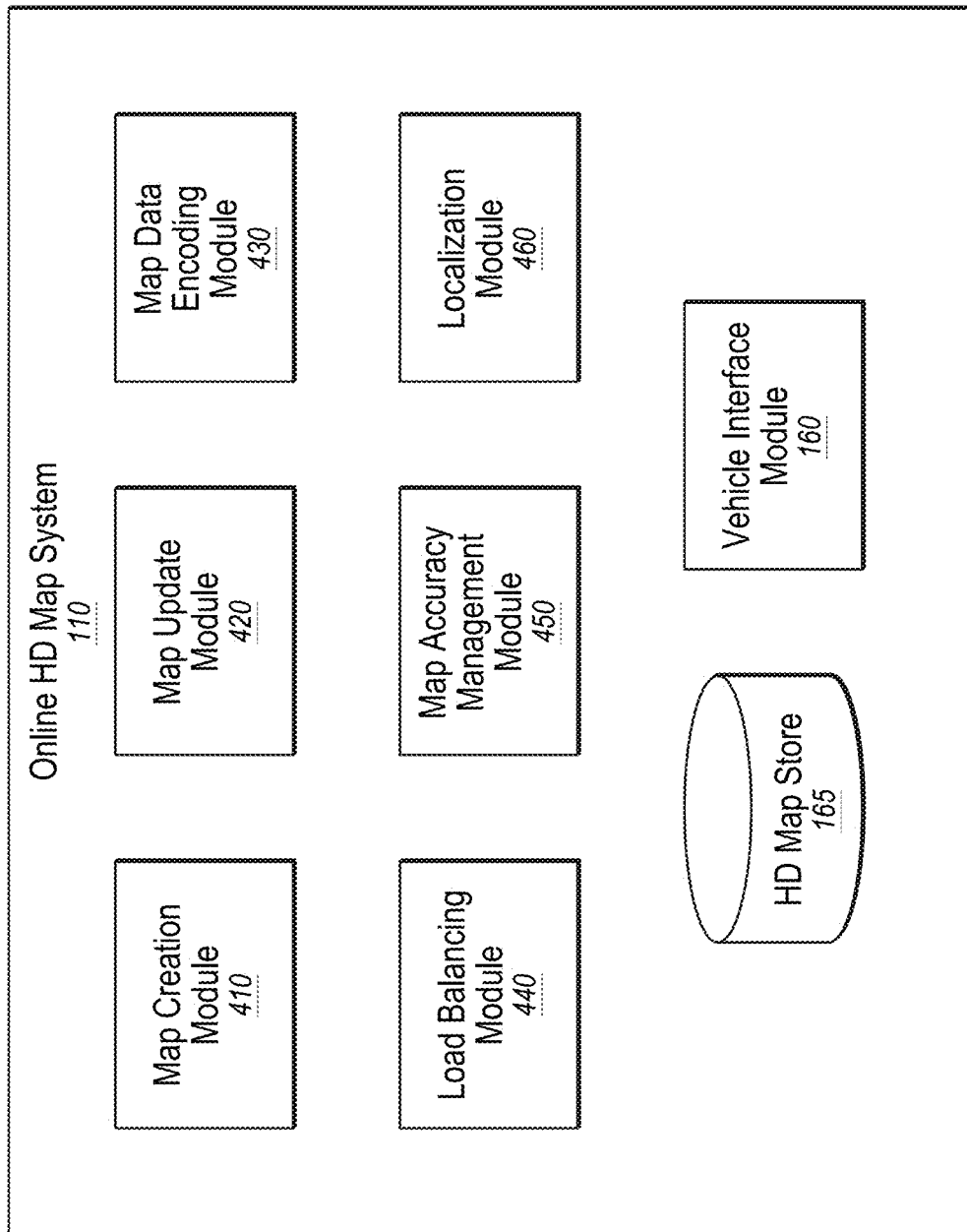
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
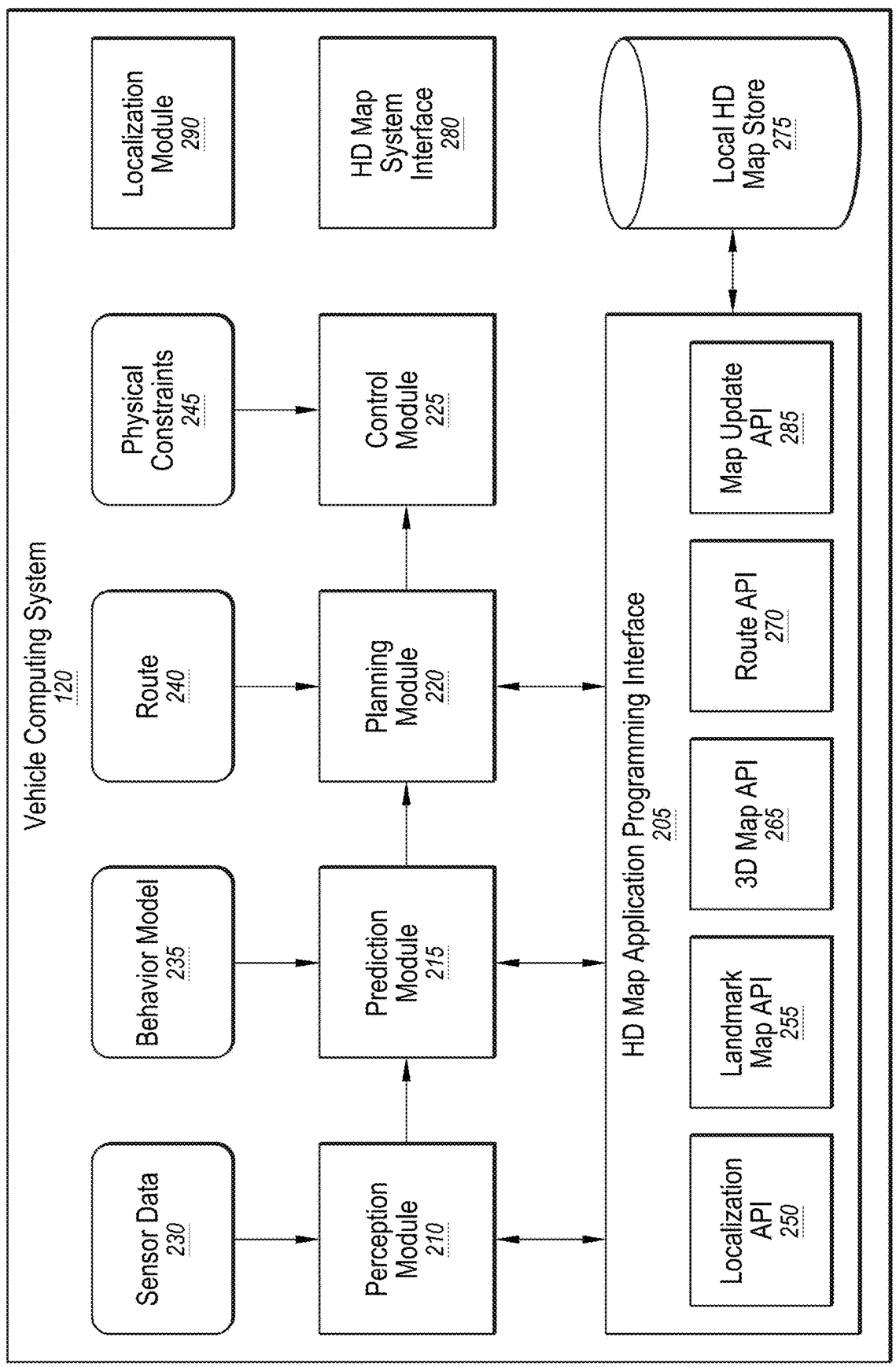
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a localization module 290, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The localization module 460 may be configured to perform actions similar to those performed by the localization module 290 of FIG. 2.

Figure 5:
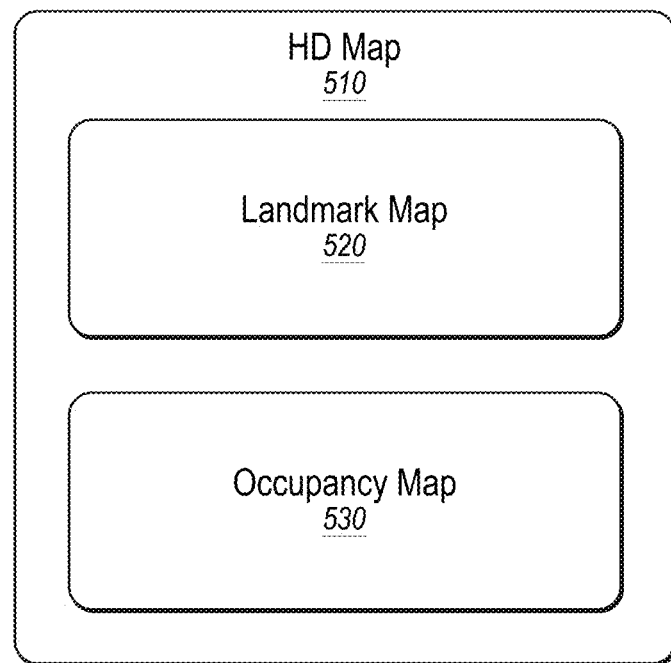
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
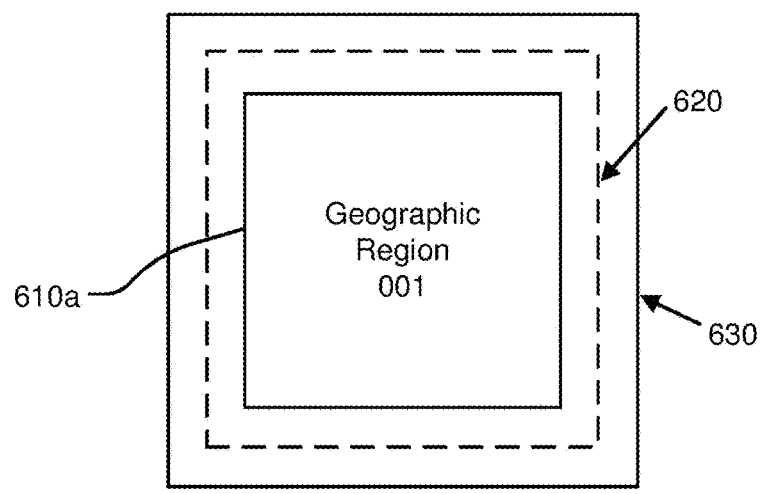
FIGS. 6A-6B illustrate example geographical regions defined in an HD map.
Figure 6B:
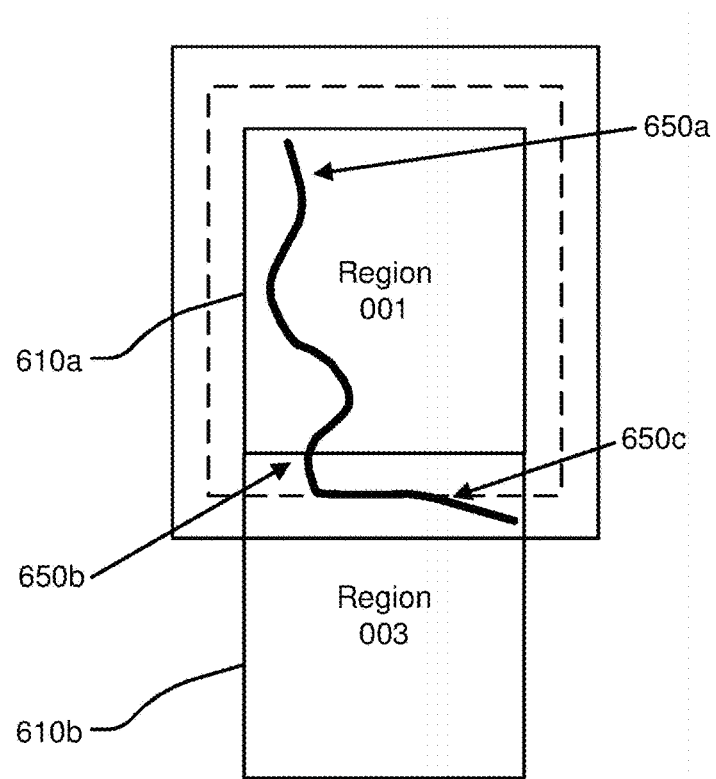

FIGS. 6A-6B illustrate example geographical regions 610*a* and 610*b* that may be defined in an HD map according to one or more embodiments. FIG. 6A illustrates a square geographical region 610*a*. FIG. 6B illustrates two neighboring geographical regions 610*a* and 610*b*. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610*a* and a boundary 630 for a buffer of approximately 100 m around the geographic region 610*a*.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650*a* in the geographical region 610*a*. The corresponding vehicle 150 may traverse along a route to reach a location 650*b* where it may cross the boundary of the geographical region 610 but may stay within the boundary 620 of the buffer. Accordingly, the vehicle computing system 120 of the corresponding vehicle 150 may continue to use the geographical region 610*a* as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
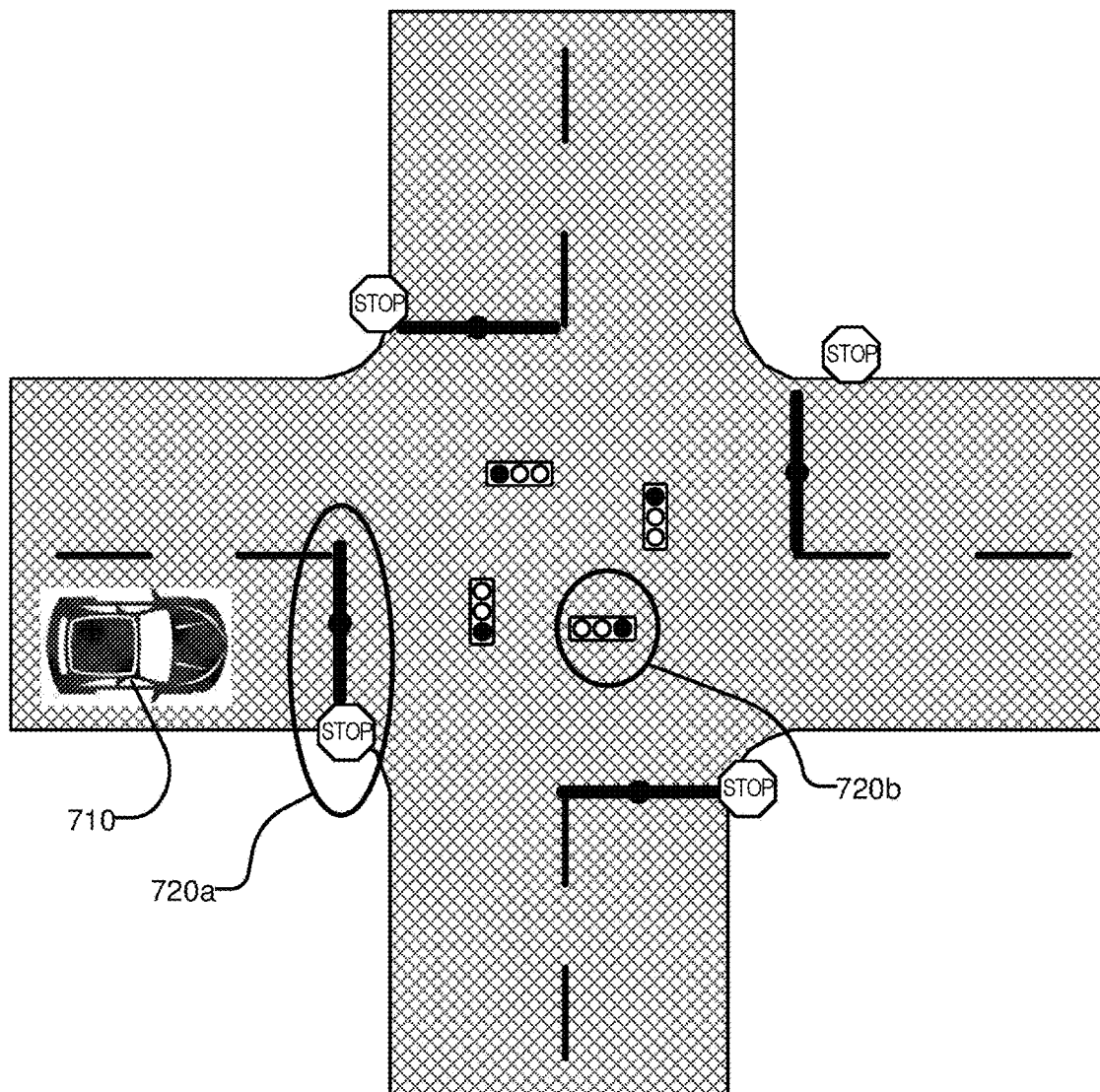
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
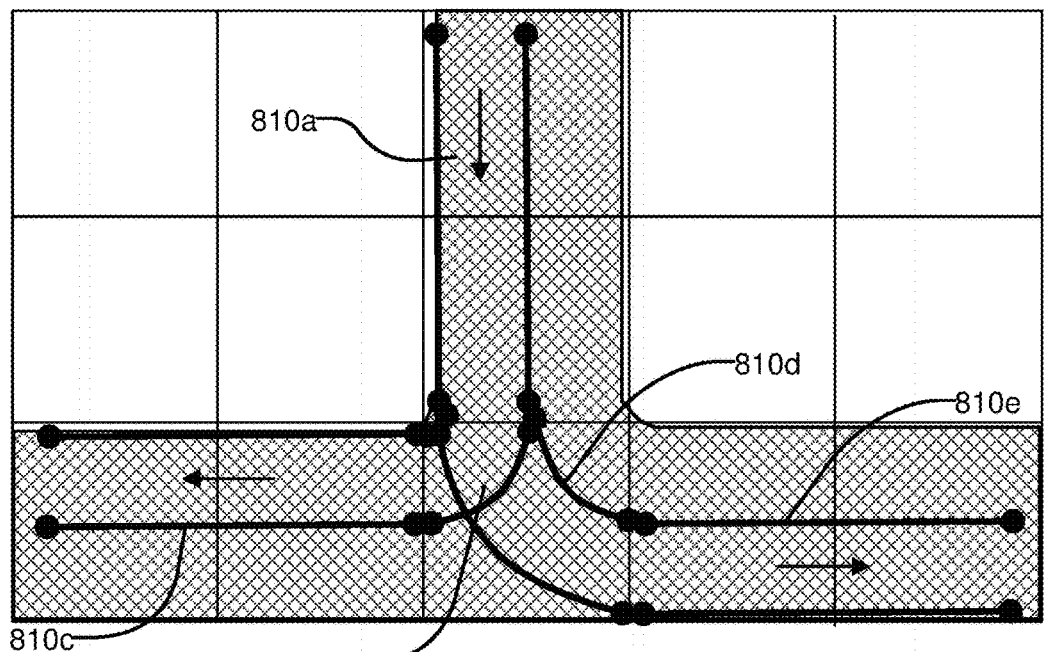
FIGS. 8A-8B illustrates example lane elements and relationships between lane elements in an HD map.
Figure 8B:
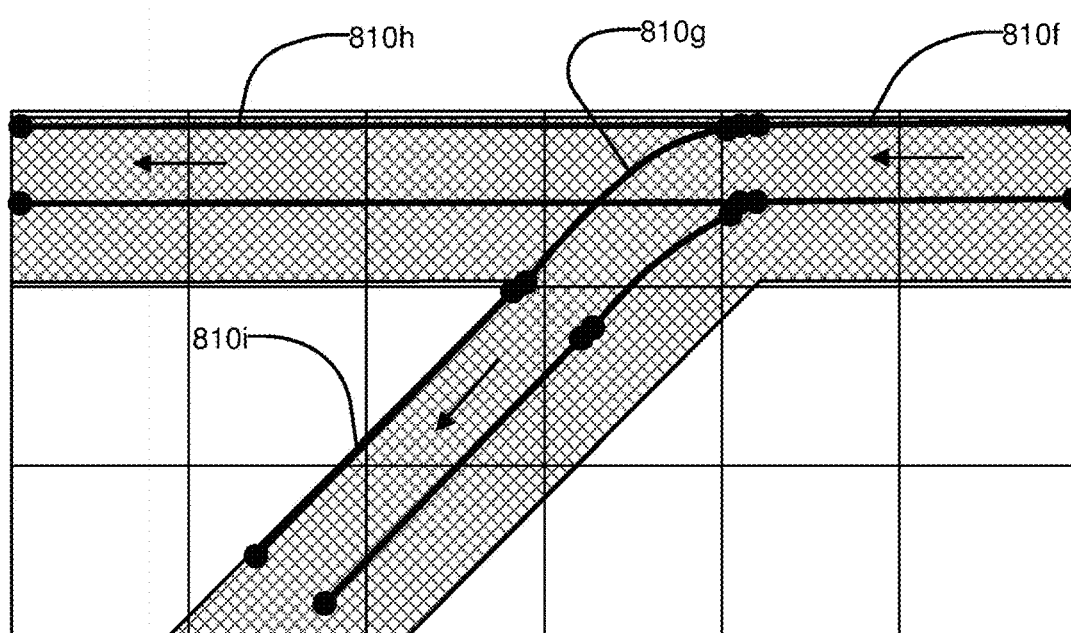

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Bootstrapping and Training Data Generation for Dynamic Objects using OMap Priors Some embodiments may involve a system performing bootstrapping of 3D data generation using the priors from weak classifiers (e.g., for image/LIDAR data) and a cleaned OMap. The system may generate per-point labels and amodal bounding boxes in individual LIDAR-scans.

In some embodiments, a cleaned OMap may be an OMap which only has static objects as occupied voxels. Instead of deleting voxels which get ray-traced or are manually-removed, the system may mark them accordingly. Additionally, the OMap may have marked ground and navigable boundary nodes. The system may gather these priors and generate good estimates of labeled data for human review.

The system may continually generate training data for ground truth labels and for improving the performance of machine-learning/deep-learning models/classifiers. The system may use information from an OMap to assist in the generation of labeled data. Some embodiments may include a training data pipeline for dynamic objects (e.g., vehicles, pedestrians, etc.). Although cars are referred to herein as an example of a vehicle, the same pipeline may be extended to other types of vehicles and pedestrians. Some embodiments of the pipeline may contain one or more of the following stages: instance segmentation, labels prior, tracking, bounding box proposal, and human review. In some embodiments, the system may generate LIDAR-scan annotations using an artificial intelligence (AI) for vehicles and pedestrians, filter the annotations which get ray-traced completely, and cluster together the remaining annotations (e.g., non-moving vehicles and pedestrians). In some embodiments, information for flagging samples with false positives and false negatives may be obtained from various observations. For example, false positives may be caught during OMap review, when an edited/rejected "clustered" annotation flags false positives of all the LIDAR scan annotations contained therein. In another example, false negatives may be caught during manual OMap quality assurance, in which for each node, that should be ideally removed, the system gathers a neighboring LIDAR scan containing the points. In another example, re-projected point masks may encode information if the object "can" move, with the difference between AI generated semantic labels for LIDAR-scans and re-projected masks being used to catch falsely labeled/missed detections.

With regard to instance segmentation stage (Stage 1), the OMap may have accurately labeled ground-nodes and navigable boundaries. Since the system may store a cleaned-OMap, the points which belong to dynamic objects may be removed. This information can be used to generate accurate clusters of dynamic objects in LIDAR scans. This process of instance segmentation may include the following actions:

1. Voxelize raw-LIDAR scan to OMap resolution
   a. Unwind the raw-LIDAR scan
   b. Transform the LIDAR scan to its alignment pose
   c. Voxel LIDAR-scan in local-sector coordinates
2. Remove Static Points:
   a. For each key in voxelized LIDAR-scan, filter the points if the corresponding OMap node is occupied
3. Filter based on ground prior:
   a. Remove points which are far from ground plane (detected from OMap ground/navigable boundary)
4. Spatial Clustering:
   a. For remaining points, compute spatial neighbors and assign an instance id After this stage, the system may have a segmented point-cloud which contains only dynamic objects, each tagged with an instance id.

With regard to the labels prior stage (Stage 2), the goal of this stage may be to refine and assign a prior label to each instance detected in the instance segmentation stage. In some embodiments, the system may use weak classifiers to generate per-point labels. There may be two or more types of classifiers that the system uses, including classifiers which work on a cluster of points, and classifiers which work on per-point labels.

With regard to classifiers which work on clusters of points, the system may ensure that the classifier receives input which is free of point-cloud segmentation error by using Stage 1. Moreover, each instance from Stage 1 may be a dynamic object. Therefore, any cluster detected as "static class-type" may be a false-negative. The classifier may generate a "dynamic class-type" label for each instance.

With regard to classifiers which work on per-point labels, per-point labels may be generated by deep-learning models which detect cars in images as well as which work directly on LIDAR-scans or data from any other type of sensor or combination of sensors.

This process of the labels prior stage may include the following actions:

1. Generate per-point labels for LIDAR-scan
2. For each instance in Stage 1:
   a. Get max-voted label for the points contained in the instance id.
   b. Label ambiguity may be used to prioritize tasks for human-review. [Stage 5]
3. For remaining labeled-points which fall outside the instances detected in Stage 1:
   a. Spatially cluster the points and create new instances
   b. Trigger OMap edit tasks for manual review.

After this stage, the system may have a segmented LIDAR point-cloud, with an instance id and a class label.

With regard to the tracking stage (Stage 3), this stage may assign a single instance id across multiple LIDAR scans. That is, for a given LIDAR scan, this stage may classify instances from Stage 2 as dynamic/static. For each frame, the system may pick −N/+N neighborhood frames and tracks instances to be labeled. In some embodiments, this may only be required for bounding box estimation. This stage may be skipped if per-point labels are sufficient. The instances may be also labeled as "dynamic/static" using information from the OMap. In some embodiments, the instances which cover the OMap "manually-removed" voxels may generally belong to non-moving vehicles. For non-moving vehicles, the system may then assign unique instance-ids for all the frames. The remaining instances may be tracked using any one of various tracking algorithms (e.g., Mean-Shift Tracking). The instance which fall inside same cluster-mode may be assigned a unique instance-id.

This process of the tracking stage may include the following actions:

1. For each scan in the neighborhood:
   a. Detect instances [in single LIDAR-scans] as dynamic/static using OMap prior 2. For each static instance:
   a. Search for the nearest instance in neighborhood-scans and assign unique ids.
3. For each dynamic instance:
   a. Perform a tracking algorithm (e.g., Mean Shift) on instances from neighborhood scans and assign unique ids which fall the cluster mode.

After this stage, the system may have a single instance id for an object shared across the neighborhood of point-clouds. For example, a car (e.g., with instance id 1) moving in LIDAR-frames 0-10, may be labeled as instance_id 1 in individual LIDAR scans.

With regard to the bounding box estimation stage (Stage 4), the goal of this stage may be to estimate an amodal bounding box for each instance detected in Stage 3. In some embodiments, moving and static objects may be handled differently in this stage.

For example, for static objects, the system may:
1. Merge the neighborhood point-cloud and filter the points which belong to the given unique id.
2. Compute non-axis aligned bounding box using PCA and min-max along principal axes.

Further, for moving objects, the system may:
1. For each moving object instance-id
   a. For each LIDAR scan in the neighborhood:
      i. Filter the points which fall in the instance id
      ii. Project on points on the ground plane
      iii. Compute line segments to detect the edge of the instances using Hough Transform (which may provide for strong outlier rejection)
      iv. Compute instance-coordinate frame along max line-segment found from the previous step and normal to it (e.g., flipped away from the LIDAR center)
   b. For all XY line-segments computed, get the maxX and maxY lengths.
      i. Use standard width and length if maxX and maxY lengths are small
   c. Construct bounding boxes with maxX and maxY around the instance id in each LIDAR scan.

With regard to the manual review stage (Stage 5), the goal of this stage may be to review per-point labels and bounding boxes estimated from previous stages. The reviewer may test for bounding box size (using merged point-cloud) and class labels. The proposals may be corrected and added to the dataset.

Vehicle Detection/Removal in an OMap

An OMap may be generated using the LIDAR points from track data in an alignment. The LIDAR points may include points on temporary objects, and as such they may get mapped into the OMap. In some embodiments, the system may remove these points to have an accurate OMap representation.

A localizer may use OMap points to perform localization. The localizer may use raw point cloud scans to perform ICP vis-a-vis OMap to compute a vehicle pose. Where there is no perception module to detect and filter moving points from a LIDAR scan, the localizer may aim to find correspondences for all the points in the scan. Thus, it may be important for the OMap to not have any erroneous points in order for the localizer to find false correspondences, especially the case of parked vehicles (e.g., parked cars).

In some embodiments, it may be highly probable that the parking locations in a map will have some parked car at different times, thus making them more or less persistent during recording data but their exact locations vary by a slight margin. If a parked car gets mapped in the OMap and another parked car (with a slight offset) is captured in the raw scan during localization, the ICP may try to find the correspondence between the OMap car and LIDAR car, thus contributing to an error in the localizer results. It may therefore be important to have accurate representation of the OMap which should only consist of static points.

The OMap may be constructed using LIDAR data which is collected in an environment with moving objects. These moving points may get mapped onto the OMap, which may generate noisy maps. Much of these dynamic points may be removed by post-processing of the OMap using ray tracing. However, the system may fail to remove the points which are persistent during recording data but are not static (e.g., parked cars). Moreover, ray tracing may be restricted to work only on the points above the OMap detected ground. Thus, objects such as pedestrians and parked-cars on curbs may be either partially removed or not removed at all. Currently, car removal from the OMap may be done by a manual review process which is time consuming and inefficient. For example, it may be difficult to locate a car and carve out the points corresponding to the car without removing static points from the OMap.

In some embodiments, the system may perform object detection (e.g., car detection) and assist in the removal process from the OMap. This may improve the OMap in a variety of ways. For example, the system may efficiently detect cars in the OMap. It may be difficult for reviewers to look through an entire alignment (which may be noisy) and detect objects (e.g., cars—parked, streaks from non-ray traced regions, noisy points around ray-traced regions, etc.). The automated approach disclosed herein may allow users to have a high recall of car detections in the OMap with significant precision. In another example, the system may enable visualization/selection tools for projected detections on the OMap for manual review. It may be difficult for reviewers to select points to be removed from the OMap. For example, most of the non-ray traced cars may be on curbs and may often be cluttered with some surroundings, and therefore it may become necessary to efficiently select the points belonging to the car and to not remove points belonging to the surroundings.

In some embodiments, automated car detection in an OMap and car-removal review tool may employ a car detection pipeline. The car detection pipeline may generate proposal marks and volumes in the OMap. The visualization tool may help operators to jump to the proposed locations and perform review and car-removal.

The process may include the following three actions:
1. Object Detection in 3D point clouds: Deep learning models may perform instance based object detection on images. The system may project 2D object detection on corresponding 3D point clouds. The projected points in the point cloud may then be refined to get precise points on car in 3D. The detected car points in the point cloud may then be transferred to the OMap as proposals for operators to review.
2. Projecting Detected objects to OMap: Since the detection may be found on all point cloud frames, there may be multiple detections for a single instance of a car. Moreover, beyond detections which are already removed from OMap using ray tracing, the system may check correspondence of each detection using point cloud diffs (vis-a-vis the OMap) and reject proposals for which no correspondence was found. The remaining proposals may be converted from vehicle coordinates to LatLngAlts and may be clustered using a tracking algorithm (e.g., a Mean Shift algorithm).

3. OMap review tool: The user interface may include features to quickly jump-to proposed locations for quick review, accept or reject proposed car volumes, tools for adjusting/selecting points the proposed car volume and a points deletion pipeline.

Object Detection in 3D Point Clouds

In some embodiments, object detection in 3D point clouds may include at least the following six actions.

Figure 9A:
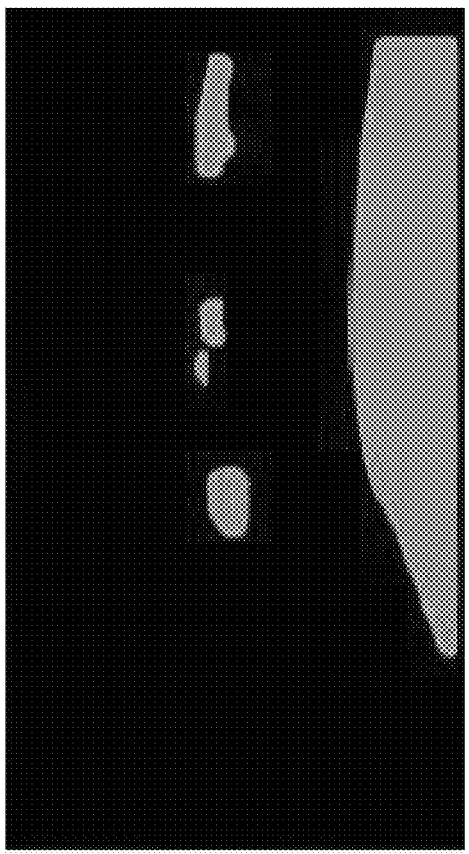
FIG. 9A-9F illustrate example implementation details of automated vehicle detection in an OMap.
Figure 9A:

1. Generate Object Masks in Images: As disclosed in FIG. 9A, which illustrates 2D car detection, using deep-learning based object detection algorithms, the system may generate flat 2D masks for a given track image.

Figure 9B:
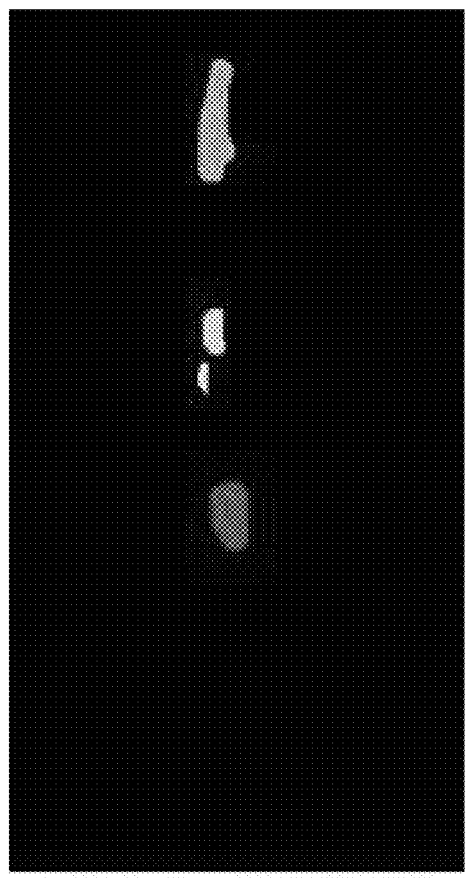
Figure 9B:

2. Refine the 2D Masks: As disclosed in FIG. 9B, which illustrates 2D own-vehicle mask removal and instance segments, using the vehicle image masks from calibration, the system may remove the proposal of the detected car hood and may perform 2D segmentation to generate per-instance masks. Per-instance segmentation may be required to refine the 3D proposals generated in action 4.

Figure 9C:
Figure 9D:

3. Generate 3D Car Segments: As disclosed in FIG. 9C, which illustrates projecting point cloud points on a 2D instance mask, the system may project point cloud points on instance masks and may generate per-instance 3D car segments proposals. These proposals may have erroneous points due to errors in Dd bounding boxes or parallax error between the LIDAR and the camera. As disclosed in FIG. 9D, which illustrates erroneous bounding box/difficult detection, there may be a faint bush between the car and the camera, which may be difficult to capture in 2D space. These may be refined using 3D segmentation.

Figure 9E:
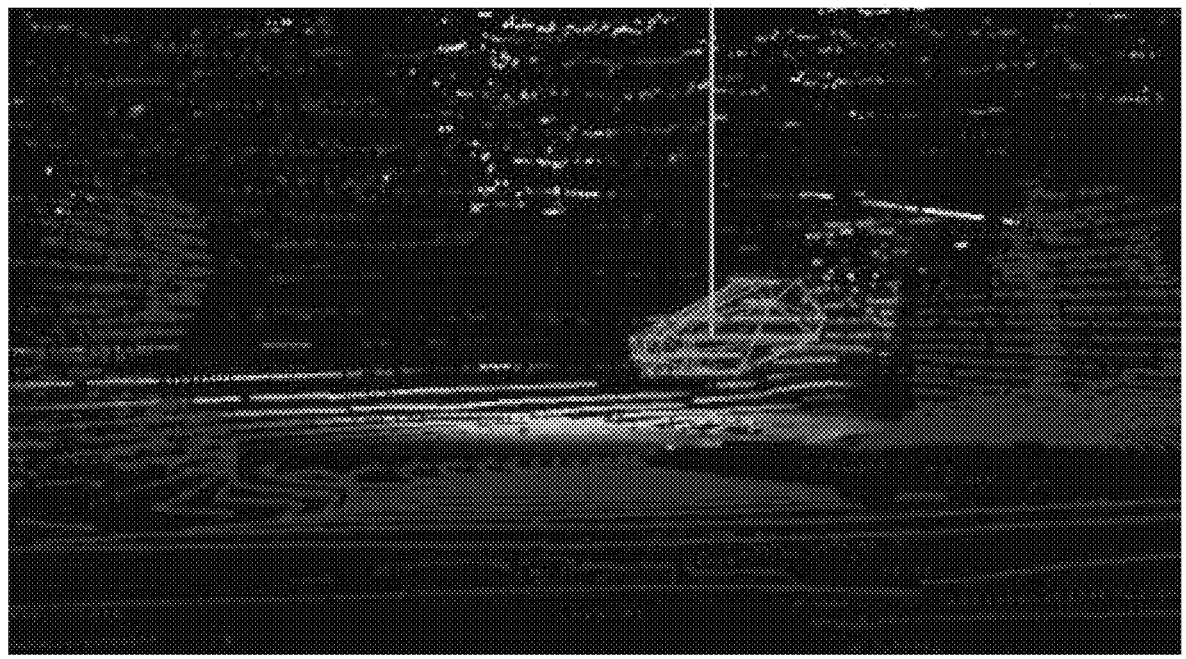
Figure 9F:
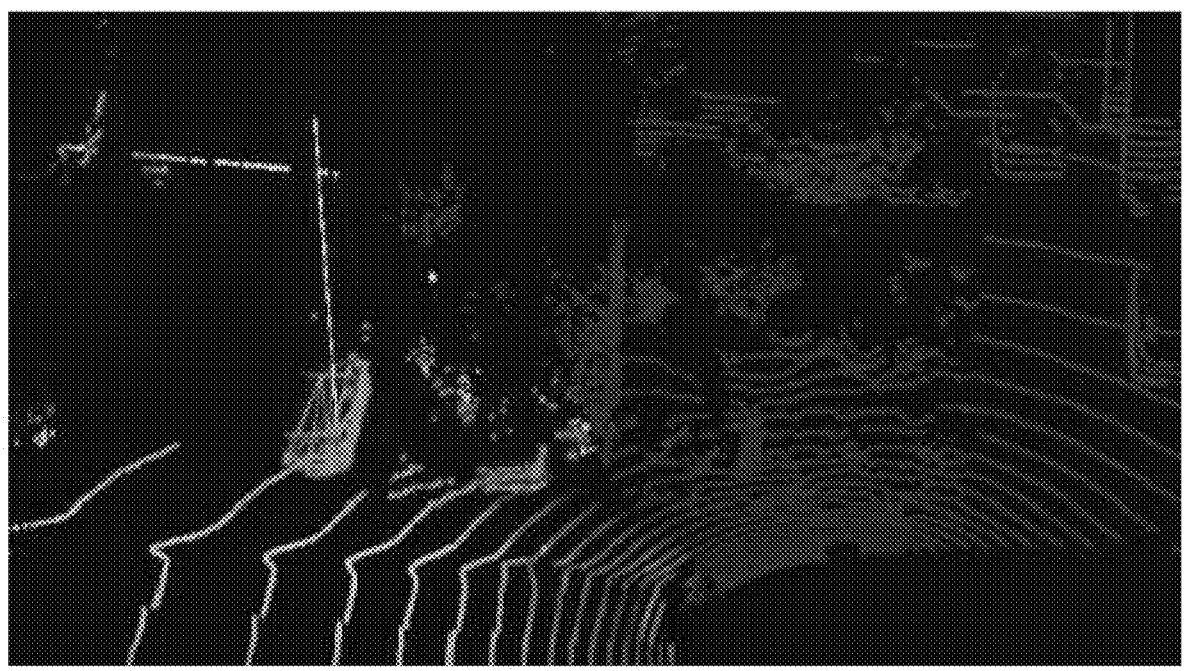

4. Refine 3D Car Segments: The proposed 3D car segments may be further refined by performing segmentation on individual car segment in 3D and selecting the cluster with the greatest number of points. The segmentation may be performed by performing ground detection in a point cloud using seed points from the OMap's ground kd-tree. For example, for the image shown in FIG. 9D, the proposed 3D car cluster is shown in FIG. 9E, which illustrates segmenting proposal points (green) in 3D. This may be corrected the proposed convex hull disclosed in FIG. 9F, which illustrates different perspective of proposed points in 3D (green) with convex hull.

5. Use Point Cloud Diffs to Filter Proposals: The points inside the refined 3D segments of cars may be checked for correspondences in the OMap. The proposal may be "marked"/accepted for review if at least one point finds a correspondence.

6. Marking Proposal Locations and Volumes: The accepted point proposals may be used to generate convex hull volumes. The centroid of each hull may be converted to LatLngAlt and stored as a point that a user can visualize, along with data associated with the object (e.g., object type, bounding box for the object, etc.) in a file for review.

Projecting Detected Objects to an OMap

Figure 10A:
FIGS. 10A-10B illustrate example implementation details of automated vehicle and convex hull detection in an OMap.
Figure 10B:
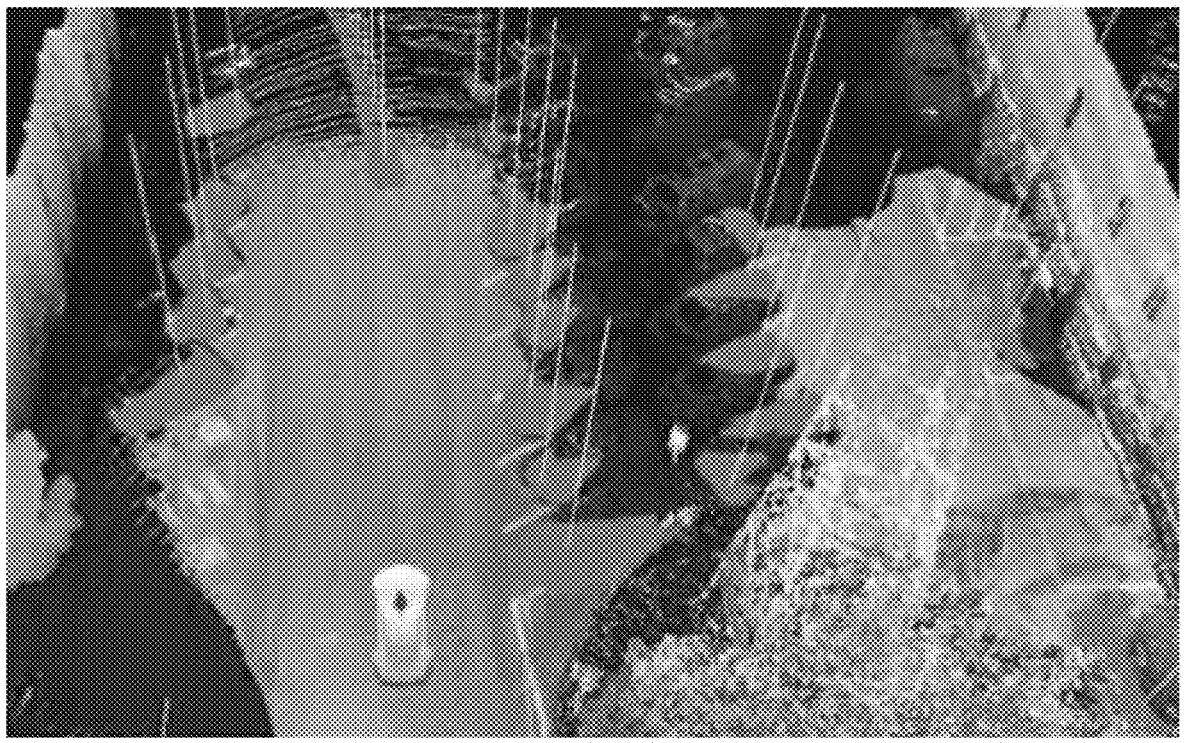

In some embodiments, since the system may detect cars on all frames of a point cloud, there may be multiple detections for single instance of the car OMap. As disclosed in FIG. 10A, which illustrates proposed locations of cars and convex hulls on an OMap, points may be marked on the OMap without filtering, which may make it difficult to jump to a proposed location to perform a review. Therefore, in some embodiments, the system may cluster the marked points using a tracking algorithm (e.g., a Mean Shift Algorithm). The result of post-clustering the marks is shown in FIG. 10B, which illustrates proposed locations of cars and convex hull on the OMap. Since each mark is accompanied with a convex-hull volume, the post-clustered mark may be indexed to have multiple object hull proposals.

OMap Review Tool

In some embodiments, the OMap review tool may include one or more of the following features:

1. Jump to Mark (Sequentially or via User Select): In some embodiments, a user may switch between a Top view and a Front view to position a car selection model on the OMap to select points inside cars, which may be time consuming and tedious. In some embodiments, with detected car locations in the OMap (e.g., MarkedPoints), the user may directly jump to a selected mark or sequentially cycle through marks using an iterator.

2. Car Axis Drag and Rotate: In some embodiments, the user may jump to a mark, by without orientation data. Using "local axis controls" may allow easy sliding and rotating of the car model using short cut keys and mouse drag.

3. Car Snap to Navigable Boundary: In some embodiments, some or all of the cars may be parked along a navigable boundary. The use may jump to a Marked position and hit a short cut key to orient a car model parallel to the closest navigable boundary.

4. Convex Hull Visualization: In some embodiments, since the car location proposals may be generated even if one point in a raw-point cloud finds a correspondence in the OMap, there may be cases where most of the car is removed from the OMap by ray-tracing leaving few noisy points. Visualization of the convex hull may help the user to understand if a given noise point belonged to a car-point and needs to be removed.

5. Deleting Marks: Users may delete Marked proposals once they are done reviewing the proposals. This may avoid duplicate review and ease in jumping to the previous or next unresolved Mark.

In some embodiments, generic object detection may include one or more of the following features:

1. The 2D detection may supports various classes.
2. The system may perform pedestrian detection in OMap
3. The system may detect traffic lights/signs, which can be used as priors to a ray tracing algorithm—to avoid removing points around those volumes.
4. The system may work well to generate locations of the cars in the OMap. Using a prior car model and performing ICP on vertices of a merged-convex hull, the system may determine an accurate car-orientation.

Bootstrapping and Generating Training Data for Dynamic Object Identification Using an OMap Some embodiments may include a system that uses sensor data including 3D data points corresponding to objects surrounding a car that are tracked using a sensor assembly such as LIDAR. The 3D data points may correspond to temporary objects, parked or moving, as well as static and permanent objects. For example, LIDAR data may capture both static (buildings, roads, etc.) and dynamic (cars, pedestrians, etc.) data. The term "dynamic" may refer to temporary objects in the scene, whether moving or stationary.

As described with respect to FIG. 5, the OMap 530 may include spatial 3D representation of a road and all physical objects around the road. The data stored in the OMap 530 may also be referred to as occupancy grid data. The OMap may discretize the occupancy grid data and stores the data as voxels. Accordingly, a point may correspond to a voxel in the OMap, and the two terms, point and voxel, may be used interchangeably. A clean OMap may include occupancy grid data that only corresponds to persistent objects in the environment, with no data corresponding to temporary, dynamic objects such as cars, pedestrians, bicycles, etc.

Voxels in the clean OMap that may be ray-traced or manually "removed" data may be marked as such in the clean OMap, but the voxels are not deleted. Thus, in the clean OMap, static objects may be represented as occupied voxels. A time scale for considering an object in the scene as static or dynamic may be based on the order of the update frequency of the OMap. Thus, while a building is a static object, a moving car and a parked car are both considered as dynamic objects. The clean OMap may also depict the ground as well as navigable boundaries.

Detecting dynamic objects from the 3D sensor data such as the LIDAR scan data may be performed using deep learning object detection algorithms. However, continual generation of training data may be required for ground truth labels and improving the performance of these deep-learning algorithms. Some embodiments may use information from the clean OMap to assist in generating labeled data representing distinct objects, as well as in identifying false positives and false negatives in the deep learning algorithm models and/or deep learning classifiers. Although some examples herein use the example of detecting dynamic objects such as cars, embodiments disclosed herein may be applied to all dynamic objects typically seen in these environments, including other types of vehicles, pedestrians, etc.

Instance Segmentation

In some embodiments, the accurately labeled ground and navigable boundary information in a clean OMap may be used to identify clusters of points that may correspond to dynamic objects in raw 3D sensor data, for example, LIDAR scans. In some embodiments, the raw 3D sensor scan data may be first voxelized to the resolution of the OMap data. This may be performed in LIDAR data by unwinding the raw LIDAR scan data, and transforming the data into the alignment pose. Subsequently, the LIDAR scan data may be voxelized into the local sector coordinates. The voxelized scan data may then be compared to the corresponding OMap occupancy grid data to identify voxels in the scan data that correspond to occupied voxels in the OMap that depict static points in the scene. The identified voxels may be removed from the voxelized scan data. The remaining voxelized scan data may then be filtered using the ground and navigable boundary information from the clean OMap to remove the corresponding points. The remaining points in the voxelized scan data may be spatially clustered based on the local neighborhood points. Each generated cluster may be assigned an instance identification. Thus, the instance segmentation may lead to the generating of a segmented point-cloud that contains moving object segments, where each segment is tagged with an instance id.

Training Data Generation

In some embodiments, a segmented point cloud with each segment tagged with an instance id may be used as training data on weak classifiers that are applied to a cluster of points to classify objects as "moving" or static." The instance segmentation performed on the 3D scan data may ensure that the point cloud is free of segmentation errors. Thus, each cluster of points associated with an instance id may correspond to a moving object. Therefore, any 3D cluster that is labeled by the classifier as a "not-moving" class label may be a false-negative. Every cluster of 3D points in the scan data that is associated with an instance id from the instance segmentation may be labeled as a "moving" class type. Furthermore, since the OMap may only depict occupied voxels corresponding to static objects, in response to determining that the 3D points corresponding to the particular 3D cluster of points, or instance, have corresponding occupied points in the OMap, if the weak classifier labels the instance as moving, then establishing that a classification of the particular instance as "moving" by the weak classifier may be a false positive. The 3D data with the corrected labels may be provided as training data to the weak classifier.

Generation of Per-Point Labels

In some embodiments, the 3D scan data may be initially processed using deep learning algorithms (e.g., implemented by deep learning classifiers) generating point masks to generate per-point labels for the scan data. The segmented point cloud generated during the instance segmentation may then be analyzed using the per-point labels. In some embodiments, for each instance segment generated during the instance segmentation, the points represented by an instance id may be analyzed with respect to the generated per-point labels to obtain the max-voted point label. Points within the instance segment that exhibit any ambiguity in the labels may be marked for subsequent manual review. Thus, each segment in the 3D scan data may then be associated with an instance-id (from the instance identification) and a class label (from the per-point label analysis). In some embodiments, any 3D scan points that are not part of the detected instances generated during instance segmentation may be spatially clustered and associated with new instances and may be subject to subsequent review with respect to the OMap since they may, for example, reflect the presence of erroneous dynamic objects in the OMap.

Tracking Across Temporally Generated Multiple 3D Scan Data

In some embodiments, a system may assign a single instance id across multiple 3D scan data that may correspond to a single object that is scanned over time using a temporal neighborhood frame set. For a set of 3D scan data generated at a single point in time, the instances generated may be first classified as dynamic/static using the clean OMap data. This may be used to generate the classified instances at each frame.

In some embodiments, for a detected static instance at a particular point in time, temporally neighborhood scan data may be searched for nearest instances. Each nearest instance that is determined from the temporal neighborhood search may be subsequently assigned a unique id.

In some embodiments, for a detected dynamic instance, a tracking algorithm (e.g., a Mean-Shift Algorithm) may be applied to instances generated from the temporally neighborhood scan data, and those instances that fall into a single cluster model may be assigned unique ids.

In some embodiments, after the tracking process concludes, a single instance id may be assigned to a single object across multiple temporally neighborhood point cloud scan data. For example, a particular moving car moving across LIDAR frames 1-10 (over time) may be assigned the same unique id in each of the individual LIDAR scans.

Bounding Box Estimation

In some embodiments, a system may estimate an amodal bounding box for each instance assigned with a unique id during the tracking process described above. At this stage, instances corresponding to dynamic objects and instances corresponding to static objects may be processed as follows. In the case of static objects, the neighborhood point cloud that corresponds to the static object may be merged together, all points that belong to the assigned unique id may be filtered, and the filtered points may be used to compute a non-axis aligned bounding box using a Principal Component Analysis and a MinMax algorithm along the principal axes. In the case of dynamic objects, a system may perform the following for each dynamic object instance id applied to each 3D scan in the temporal neighborhood set of 3D scan data: Points that fall within the instance id may be filtered. The filtered points may be projected to the ground plane. A Hough transform may be used to compute line segments and therefore detect the edges of instances. A max line segment may be used to compute an instance coordinate frame along the segment and normal to the segment.

In some embodiments, for each dynamic object instance, line segments computed within the instance coordinate frames across the neighborhood frame set may be used to obtain the maximum lengths of the instance as projected on the ground plane. Default values may be used in some cases. Bounding boxes may be constructed for each dynamic object instance using the maximum line segment values projected on the ground plane.

In some embodiments, the results of the per-point labels and the bounding box estimation may be subject to manual review, and lead to correction and addition to the data set.

Figure 11A:
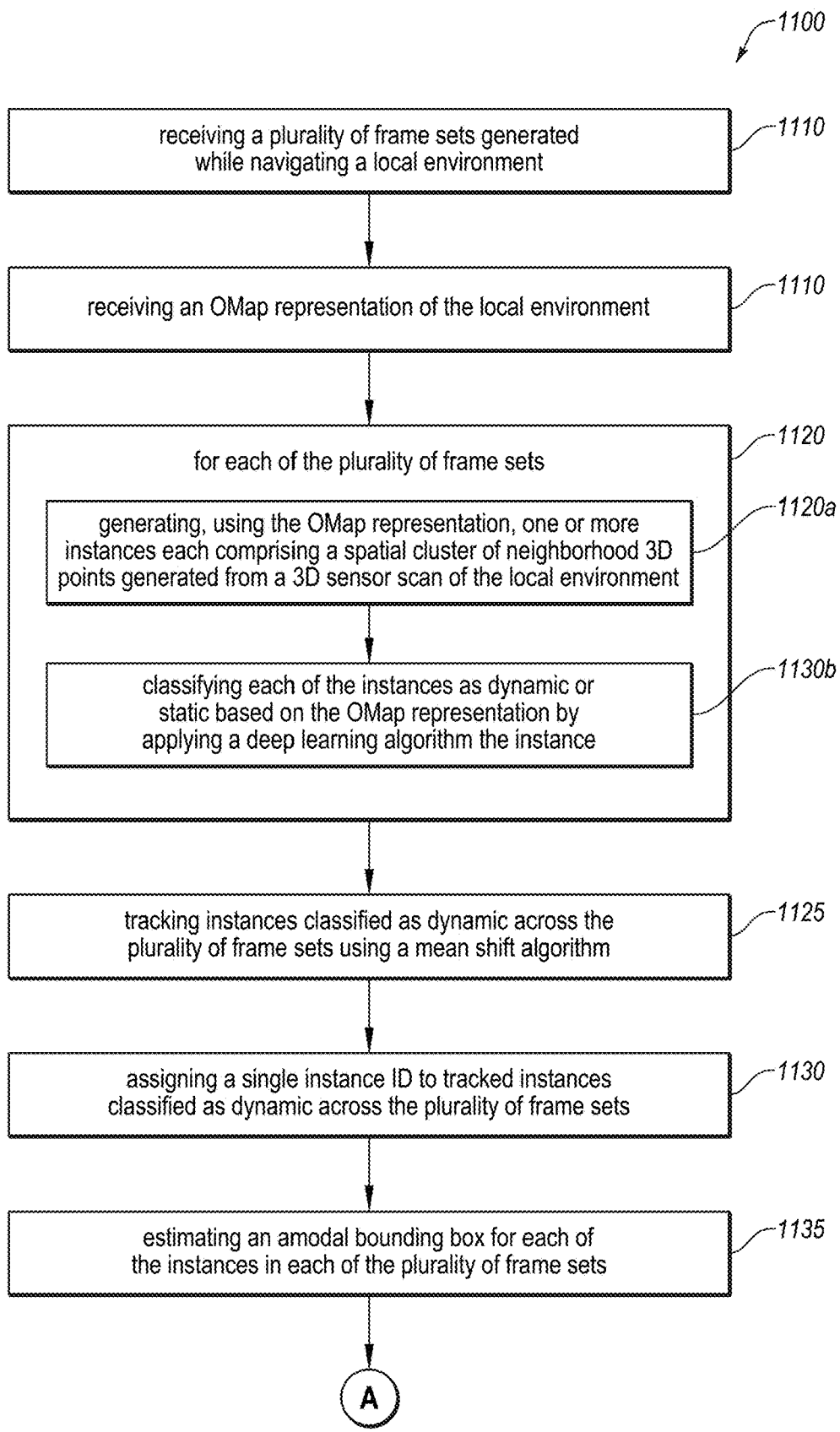
FIGS. 11A-11B illustrate a flow chart of an example method of training data generation for dynamic objects using high definition (HD) map data.
Figure 11B:
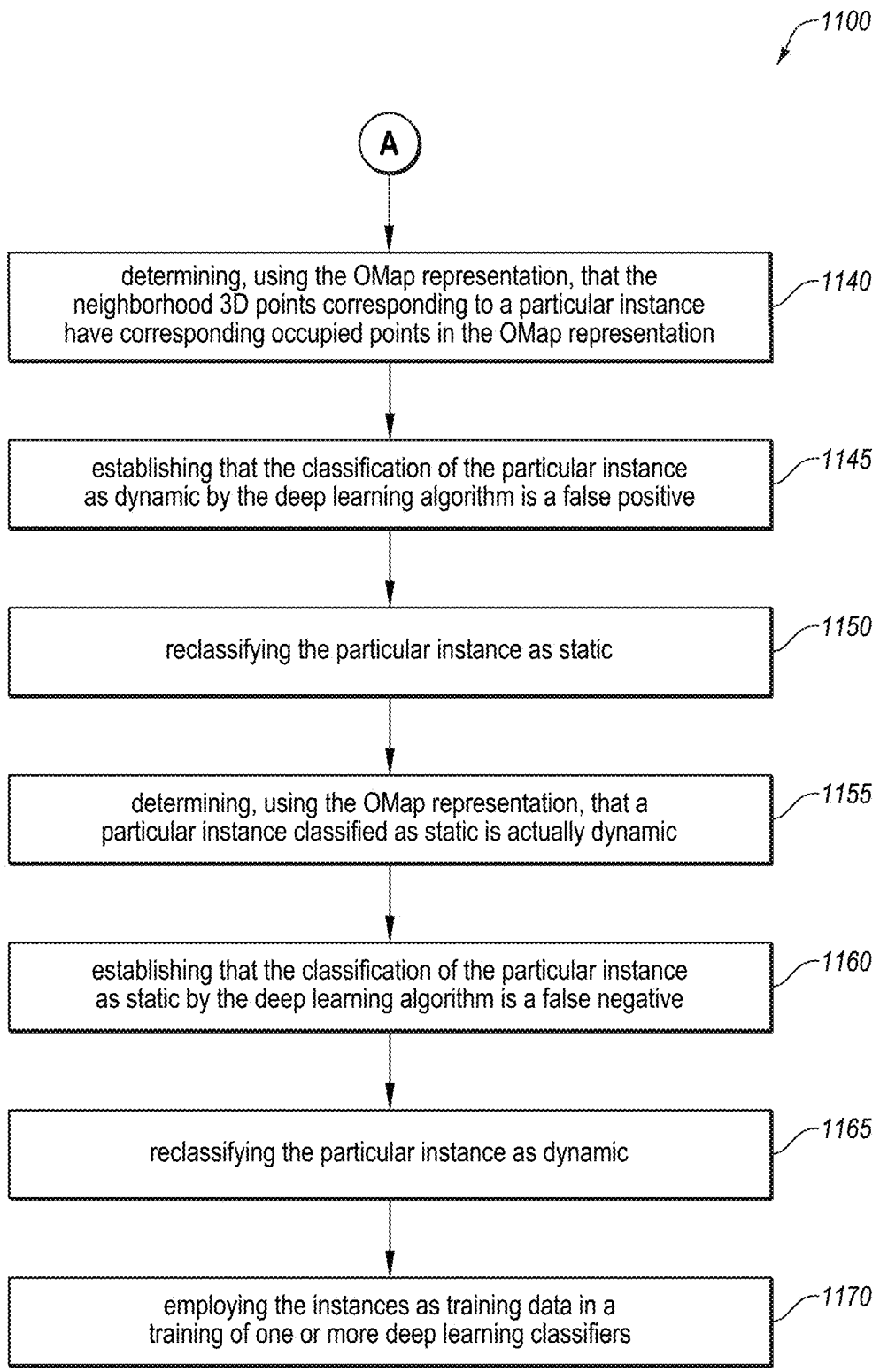

FIGS. 11A-11B illustrate a flow chart of an example method 1100 of training data generation for dynamic objects using HD map data. The method 1100 may be performed by any suitable system, apparatus, or device. For example, one or more elements of the HD map system 100 of FIG. 1 may be configured to perform one or more of the operations of the method 1100. Additionally or alternatively, the computer system 1200 of FIG. 12 may be configured to perform one or more of the operations associated with the method 1100. Although illustrated with discrete blocks, the actions and operations associated with one or more of the blocks of the method 1100 may be divided into additional blocks, combined into fewer blocks, or eliminated, depending on the particular implementation.

The method 1100 may include, at action 1110, receiving a plurality of frame sets generated while navigating a local environment. In some embodiments, each frame set may include a point cloud representation of three-dimensional (3D) points. For example, the map update module 420 of the online HD map system 110 may receive, at action 1110, a plurality of frame sets generated while the vehicle 150a is navigating a local environment, with each frame set including a point cloud representation of 3D points.

The method 1100 may include, at action 1115, receiving an OMap representation of the local environment. In some embodiments, the OMap representation may include points depicting static objects in the local environment. In some embodiments, the OMap representation may further include the ground and navigable boundaries within the local environment. For example, the map update module 420 of the online HD map system 110 may receive, at action 1115, an occupancy map (OMap) 530 representation of the local environment, with the OMap 530 representation including points depicting static objects in the local environment (e.g., buildings, roads, etc.) and including the ground and navigable boundaries (e.g., the navigable boundaries associated with roads) within the local environment.

The method 1100 may include, at action 1120, for each of the plurality of frame sets, at action 1120a, generating, using the OMap representation, one or more instances each comprising a spatial cluster of neighborhood 3D points generated from a 3D sensor scan of the local environment and, at action 1120b, classifying each of the instances as dynamic or static based on the OMap representation by applying a deep learning algorithm the instance. For example, the map update module 420 of the online HD map system 110 may, at action 1120, for each of the plurality of frame sets, generate, at action 1120a, using the OMap 530 representation, one or more instances each comprising a spatial cluster of neighborhood 3D points generated from a 3D sensor scan (e.g., a LIDAR-scan) of the local environment, and classify, at action 1120b, each of the instances as dynamic or static based on the OMap 530 representation by applying a deep learning algorithm to the instance.

The method 1100 may include, at action 1125, tracking instances classified as dynamic across the plurality of frame sets using a tracking algorithm. For example, the map update module 420 of the online HD map system 110 may track, at action 1125, instances classified as dynamic across the plurality of frame sets using a mean shift algorithm.

The method 1100 may include, at action 1130, assigning a single instance ID to tracked instances classified as dynamic across the plurality of frame sets. For example, the map update module 420 of the online HD map system 110 may assign, at action 1130, a single instance ID to tracked instances classified as dynamic across the plurality of frame sets.

The method 1100 may include, at action 1135, estimating a bounding box for each of the instances in each of the plurality of frame sets. For example, the map update module 420 of the online HD map system 110 may estimate, at action 1135, a bounding box (e.g., an amodal bounding box) for each of the instances in each of the plurality of frame sets.

The method 1100 may include, at action 1140, determining, using the OMap representation, that the neighborhood 3D points corresponding to a particular instance have corresponding occupied points in the OMap representation. For example, the map update module 420 of the online HD map system 110 may determine, at action 1140, using the OMap 530 representation, that the neighborhood 3D points corresponding to a particular instance have corresponding occupied points in the OMap 530 representation.

The method 1100 may include, at action 1145, establishing that the classification of the particular instance as dynamic by the deep learning algorithm is a false positive. For example, the map update module 420 of the online HD map system 110 may establish, at action 1145, that the classification of the particular instance as dynamic by the deep learning algorithm is a false positive.

The method 1100 may include, at action 1150, reclassifying the particular instance as static. For example, the map update module 420 of the online HD map system 110 may reclassify, at action 1150, the particular instance as static.

The method 1100 may include, at action 1155, determining, using the OMap representation, that a particular instance classified as static is actually dynamic. For example, the map update module 420 of the online HD map system 110 may determine, at action 1155, using the OMap 530 representation, that a particular instance is classified as static.

The method 1100 may include, at action 1160, establishing that the classification of the particular instance as static by the deep learning algorithm is a false negative. For example, the map update module 420 of the online HD map system 110 may establish, at action 1160, that the classification of the particular instance as static by the deep learning algorithm is a false negative.

The method 1100 may include, at action 1165, reclassifying the particular instance as dynamic. For example, the map update module 420 of the online HD map system 110 may reclassify, at action 1165, the particular instance as dynamic.

The method 1100 may include, at action 1170, employing the instances as ground truth data in a training of one or more deep learning classifiers. For example, the map update module 420 of the online HD map system 110 may employ, at action 1170, the instances as training data in a training of one or more deep learning classifiers.

Subsequent to the action 1170, the method 1100 may employ the one or more trained deep learning classifiers for dynamic object detection in navigating a vehicle, such as the vehicle 150a or another non-autonomous vehicle, through the local environment. Further, the method 1100 may be employed repeatedly as the vehicle 150a navigates along a road. For example, the method 1100 may be employed with the vehicle 150a (or another non-autonomous vehicle) starts driving, and then may be employed repeatedly during the navigation of the vehicle 150a (or another non-autonomous vehicle). The vehicle 150a may navigate by sending control signals to controls of the vehicle 150a. The method 1100 may be employed by the vehicle computing system 120a of the vehicle 150a to assist in the continual generation of training data to allow for ground truth labels and improving the performance of the deep-learning classifiers, and to enable the OMap 530 to be cleaned to remove points depicting dynamic objects in the local environment so that the OMap 530 includes points depicting only static objects in the local environment.

Computer System Architecture

Figure 12:
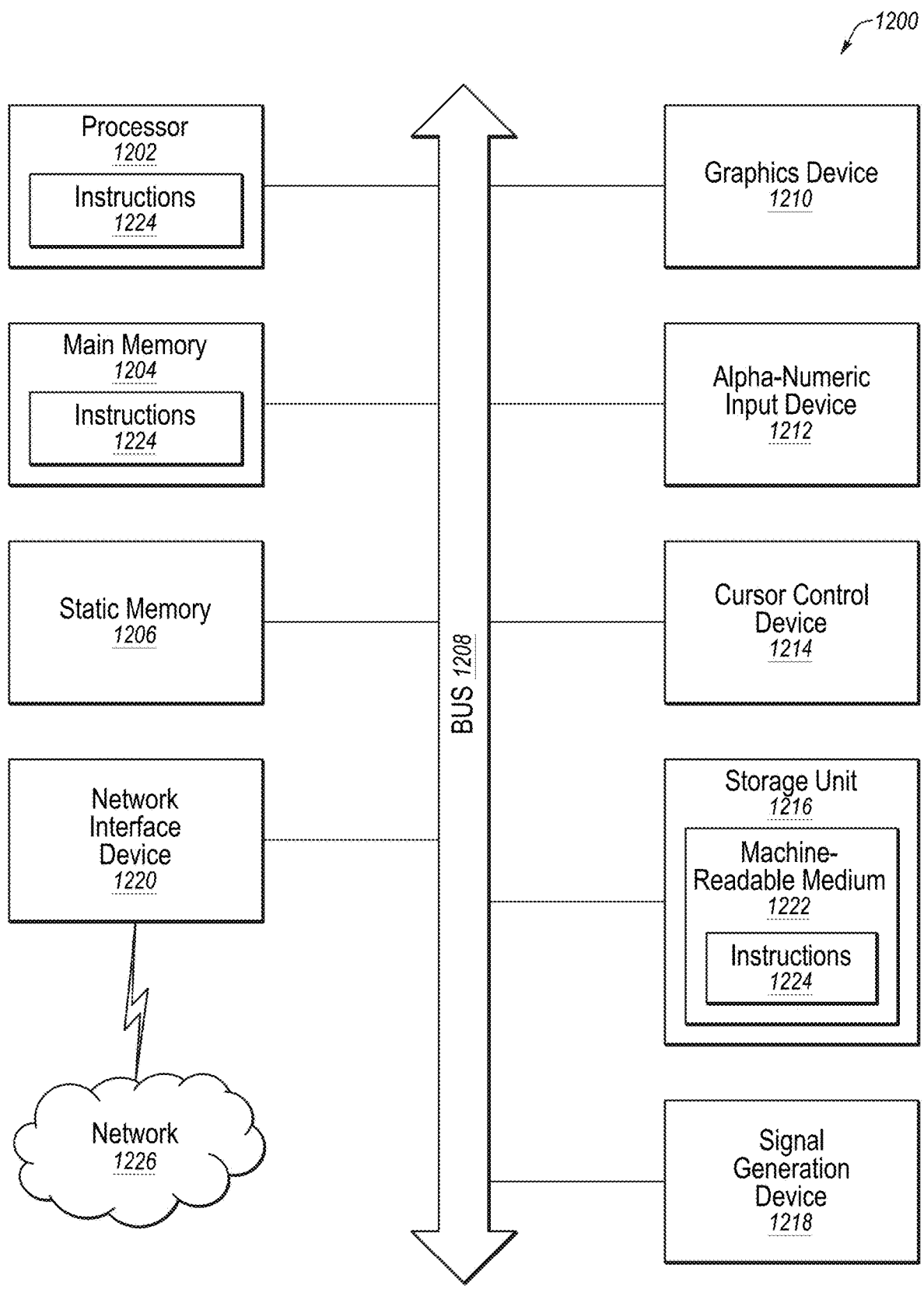
FIG. 12 illustrates an example embodiment of a computing machine that can read instructions from a machine-readable medium and execute the instructions in a processor or controller.

FIG. 12 is a block diagram illustrating components of an example computer system able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 may be part of or may be any applicable system described in the present disclosure. For example, the online HD map system 110 and/or the vehicle computing systems 120 described above may comprise the computer system 1200 or one or more portions of the computer system 1200. Further, different implementations of the computer system 1200 may include more or fewer components than those described herein. For example, a particular computer system 1200 may not include one or more of the elements described herein and/or may include one or more elements that are not explicitly discussed.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
receiving one or more frame sets generated during navigation of an environment, wherein at least one individual frame set of the one or more frame sets comprises a point cloud representation of one or more points in three-dimensional (3D) space;
receiving an occupancy map (OMap) representation of the environment, the OMap representation comprising one or more points corresponding to static objects in the environment;
for the at least one individual frame set of the one or more frame sets:
identifying one or more instances of point clusters comprising a spatial cluster of the one or more points of the at least one individual frame set;

classifying at least one individual instance of the one or more instances as dynamic or static based at least on applying a deep learning algorithm to the at least one individual instance;
auditing the classifying of the at least one individual instance of point clusters based at least on comparing the at least one individual instance to the one or more points of the OMap representation corresponding to the static objects in the environment; and
generating a bounding shape corresponding to the at least individual instance based at least on the auditing; and
updating one or more parameters of the deep learning algorithm based at least on using the bounding shape as ground truth data.

2. The method of claim 1, wherein, when an instance of the one or more instances of point clusters is classified as dynamic, the OMap representation is updated to remove respective points corresponding to the instance.

3. The method of claim 1, wherein the auditing of the classifying comprises:
determining, using the OMap representation, whether the at least one individual instance, when classified as dynamic, has one or more respective points corresponding to one or more occupied points in the OMap representation; and
in response to determining that the at least one individual instance has the one or more respective points corresponding to one or more occupied points in the OMap representation, determining that a classification of the at least one individual instance as dynamic is a false positive.

4. The method of claim 3, wherein the auditing of the classifying further comprises:
in response to the determining that the classification is the false positive, reclassifying the at least one individual instance as static.

5. The method of claim 1, wherein the auditing of the classifying comprises:
determining, using the OMap representation, whether the at least one individual instance of the one or more instances that is classified as static is actually dynamic; and
in response to determining that the at least one individual instance is actually dynamic, determining that a classification of the at least one individual instance is a false negative.

6. The method of claim 5, wherein the auditing of the classifying further comprises:
in response to the determining that the classification is the false negative, reclassifying the at least one individual instance as dynamic.

7. The method of claim 1, wherein the ground truth data corresponds to one or more of: image data or 3D point cloud data.

8. A processor comprising:
processing circuitry to cause performance of operations, the operations comprising:
identifying one or more instances of point clusters comprising a spatial cluster of one or more points of a frame set generated during navigation of an environment, wherein at least one individual frame set of the one or more frame sets comprises a point cloud representation of one or more points in three-dimensional (3D) space;
classifying an individual instance of the one or more instances as dynamic or static based at least on applying a deep learning algorithm to the individual instance;
auditing the classifying of the individual instance of point clusters based at least on comparing the individual instance to the one or more points of an occupancy map (OMap) representation of the environment, the OMap representation comprising one or more points corresponding to static objects in the environment; and
updating one or more parameters of the deep learning algorithm based at least on using, as ground truth data, the individual instance and the audited classifying associated therewith.

9. The processor of claim 8, wherein, when an instance of the one or more instances of point clusters is classified as dynamic, the OMap representation is updated to remove respective points corresponding to the instance.

10. The processor of claim 8, wherein the auditing of the classifying comprises:
determining, using the OMap representation, whether the individual instance, when classified as dynamic, has one or more respective points corresponding to one or more occupied points in the OMap representation; and
in response to determining that the individual instance has the one or more respective points corresponding to one or more occupied points in the OMap representation, determining that a classification of the individual instance as dynamic is a false positive.

11. The processor of claim 10, wherein the auditing of the classifying further comprises:
in response to the determining that the classification is the false positive, reclassifying the individual instance as static.

12. The processor of claim 8, wherein the auditing of the classifying comprises:
determining, using the OMap representation, whether the individual instance of the one or more instances that is classified as static is actually dynamic; and
in response to determining that the individual instance is actually dynamic, determining that a classification of the individual instance is a false negative.

13. The processor of claim 12, wherein the auditing of the classifying further comprises:
in response to determining that the classification is the false negative, reclassifying the individual instance as dynamic.

14. The processor of claim 8, wherein the ground truth data corresponds to one or more of: image data or 3D point cloud data.

15. A system comprising:
one or more processors comprising processing circuitry configured to cause performance of operations, the operations comprising:
identifying one or more instances of point clusters comprising a spatial cluster of one or more points of a frame set generated during navigation of an environment, wherein at least one individual frame set of the one or more frame sets comprises a point cloud representation of one or more points in three-dimensional (3D) space;
classifying an individual instance of the one or more instances as dynamic or static based at least on applying a deep learning algorithm to the individual instance;

auditing the classifying of the individual instance of point clusters based at least on comparing the individual instance to the one or more points of an occupancy map (OMap) representation of the environment, the OMap representation comprising one or more points corresponding to static objects in the environment;
generating a bounding shape corresponding to the at least instance based at least on the auditing; and
updating one or more parameters of the deep learning algorithm based at least on using the bounding shape as ground truth data.

16. The system of claim 15, wherein, when an instance of the one or more instances of point clusters is classified as dynamic, the OMap representation is updated to remove respective points corresponding to the instance.

17. The system of claim 15, wherein the auditing of the classifying comprises:
determining, using the OMap representation, whether the individual instance, when classified as dynamic, has one or more respective points corresponding to one or more occupied points in the OMap representation; and
in response to determining that the individual instance has the one or more respective points corresponding to one or more occupied points in the OMap representation, determining that a classification of the individual instance as dynamic is a false positive.

18. The system of claim 17, wherein the auditing of the classifying further comprises:
in response to the determining that the classification is the false positive, reclassifying the individual instance as static.

19. The system of claim 15, wherein the auditing of the classifying comprises:
determining, using the OMap representation, whether the individual instance of the one or more instances that is classified as static is actually dynamic; and
in response to determining that the individual instance is actually dynamic, determining that a classification of the individual instance is a false negative.

20. The system of claim 19, wherein the auditing of the classifying further comprises:
in response to determining that the classification is the false negative, reclassifying the individual instance as dynamic.

21. The system of claim 15, wherein the ground truth data corresponds to one or more of: image data or 3D point cloud data.

* * * * *